Patented Sept. 25, 1928.

1,685,443

UNITED STATES PATENT OFFICE.

GEORGES EMMANUEL ZELGER, OF MONTREUIL, FRANCE, ASSIGNOR, BY MESNE ASSIGNMENTS, TO DU PONT-PATHE FILM MANUFACTURING CORPORATION, OF WILMINGTON, DELAWARE, A CORPORATION OF DELAWARE.

METHOD FOR THE MANUFACTURE OF PLASTIC COMPOUNDS.

No Drawing. Application filed April 6, 1925, Serial No. 21,197, and in France March 10, 1925.

It has already been proposed to employ for the manufacture of plastic compounds, and chiefly acetyl-cellulose compounds, certain substances, which, when added to the said compounds render the latter uninflammable. Among the said substances are comprised the phosphates of the purely aromatic series, such as triphenylphosphate and tricresylphosphate, but these substances are chiefly disadvantageous from the fact that they will not dissolve acetylcellulose in the cold state, thus causing a diminution in the mechanical properties of the resulting plastic compound.

The present invention has for its object the use for the manufacture of plastic compounds having cellulose derivatives as a base, of mixed phosphoric esters containing one or more aliphatic radicals as well as one or more aromatic radicals.

These substances which are excellent solvents for acetyl-cellulose in the cold state are also fireproof substances which are equal or superior to those hitherto known, such as triphenylphosphate or tricresylphosphate, since they may contain a greater amount of phosphoric acid, for a given weight.

Among the said compounds which are usually liquids and can only be volatilized at high temperatures, are comprised the Monomethyl-diphenyl phosphate
Monoethyl-diphenyl phosphate
Dimethyl-monophenyl phosphate
Diethyl-monophenyl phosphate.

In these bodies, one or two phenyl radicals can be replaced by one or two cresyl radicals. The nucleus of said aromatic radicals may contain other elements, such as chlorine, bromine and the like.

The following example of the said process may be given:

100 parts acetylcellulose,
20 parts of monoethyl-diphenyl phosphate, these being mixed and stirred in the known manner for the obtainment of the requisite plastic compound.

The invention is obviously not limited to the above-mentioned proportions, and these may be varied according to the qualities to be possessed by the finished product.

The use of the substances above indicated is not limited to the preparation of acetyl cellulose plastic compounds, but they may be employed with other cellulose esters such as nitrocellulose, nitro-acetate of cellulose, or with cellulose ethers such as ethylcellulose, benzylcellulose and the like, i. e. with all the cellulose derivatives for which the said substances act either as fireproof substances, or as substances which are at the same time fireproof, plastic and solvent.

Having now described my invention, what I claim as new and desire to secure by Letters Patent is:

1. A plastic compound consisting of a mixture of acetylcellulose with phosphoric esters that have both aliphatic radicals and aromatic radicals attached to the same phosphoric acid radical.

2. A plastic compound consisting of a mixture of acetylcellulose with phosphoric esters that have one aliphatic radical and two aromatic radicals attached to the same phosphoric acid radical.

3. A plastic compound consisting of a mixture of acetylcellulose with esters containing one ethyl radical and two phenyl radicals combined with the phosphoric acid radical.

4. A plastic compound consisting of a mixture of acetylcellulose with monoethyl-diphenyl phosphate.

5. A plastic compound consisting of a mixture of 100 parts of acetylcellulose with 20 parts of monoethyl-diphenyl phosphate.

In testimony whereof I have signed my name to this specification.

GEORGES EMMANUEL ZELGER.